INVENTOR.
MARK P. BANJAVICH
BY
Cushman, Darby & Cushman
ATTORNEYS

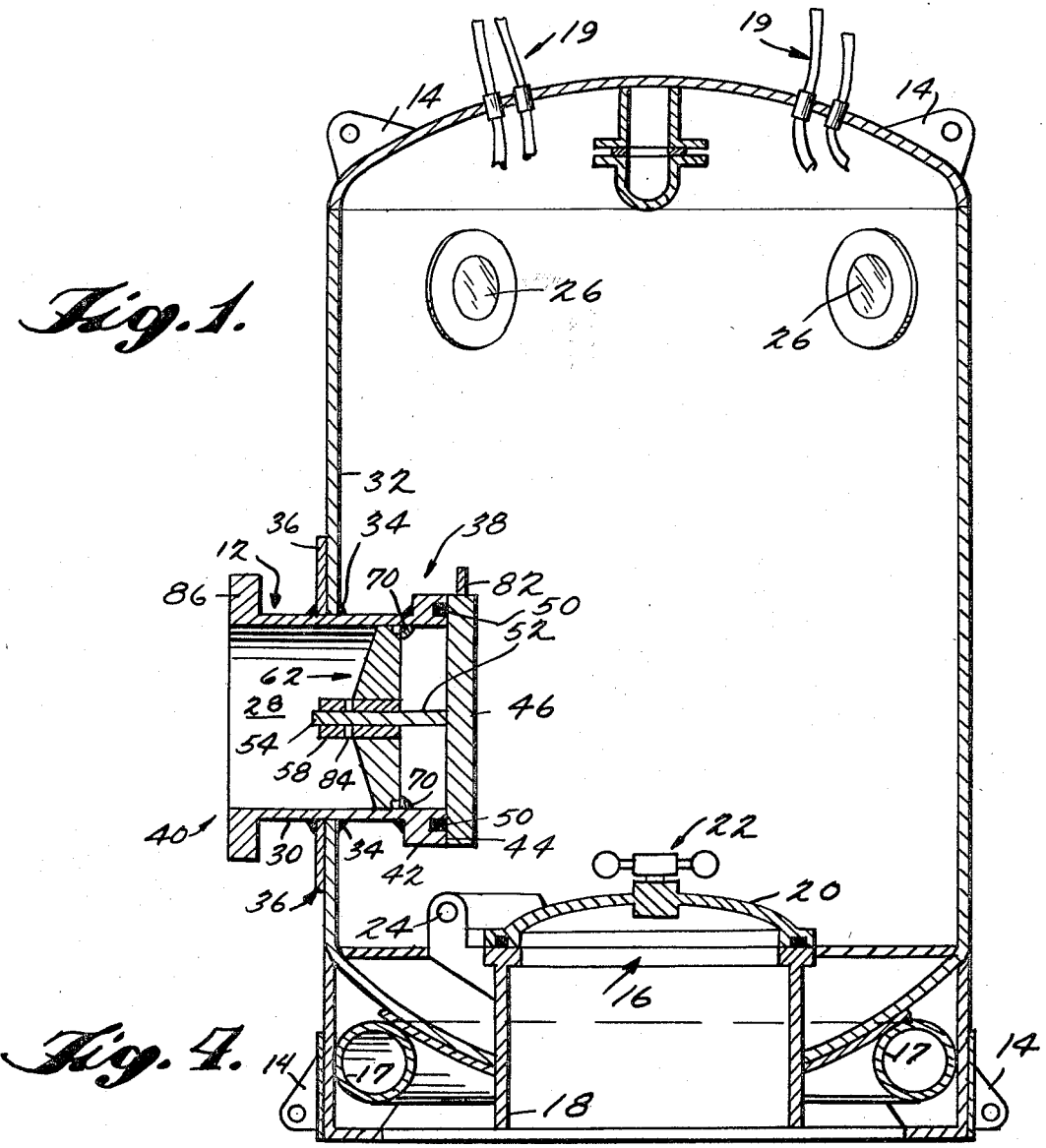
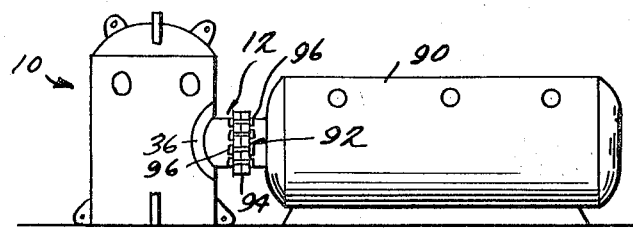

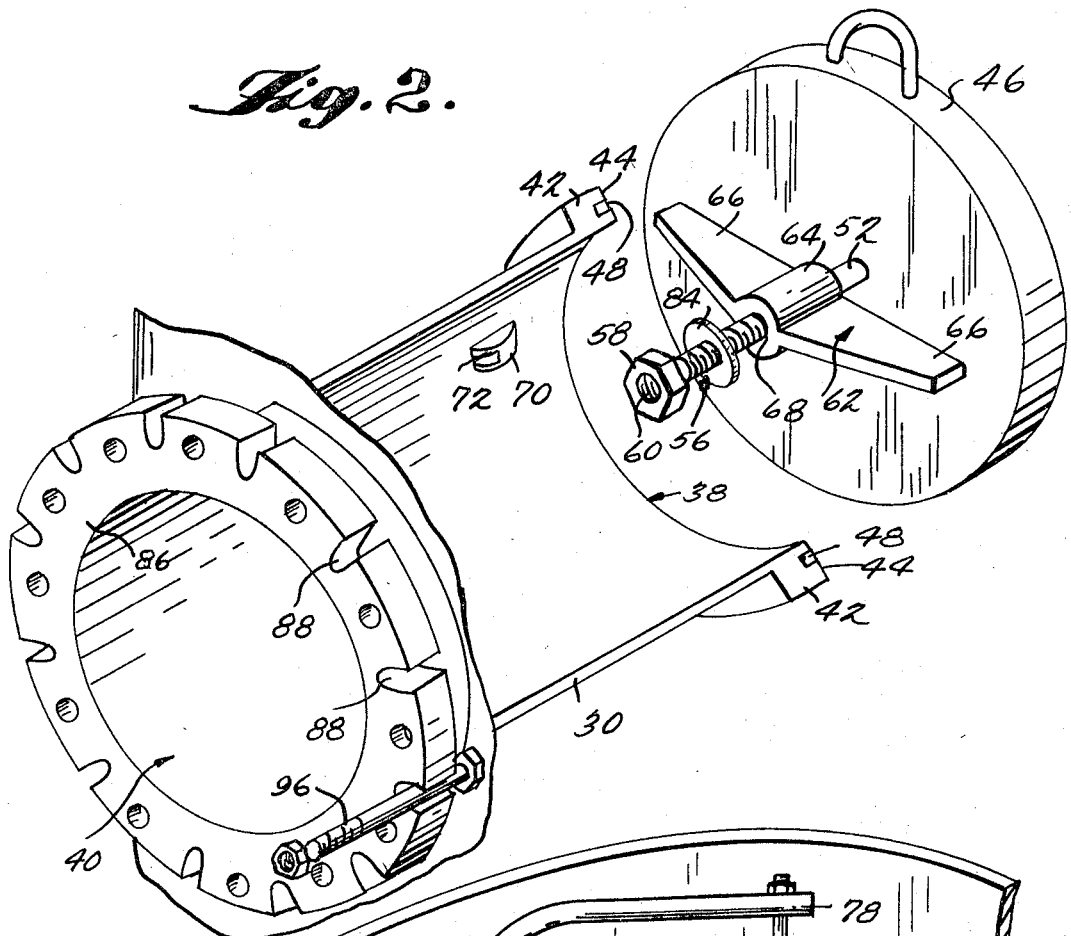
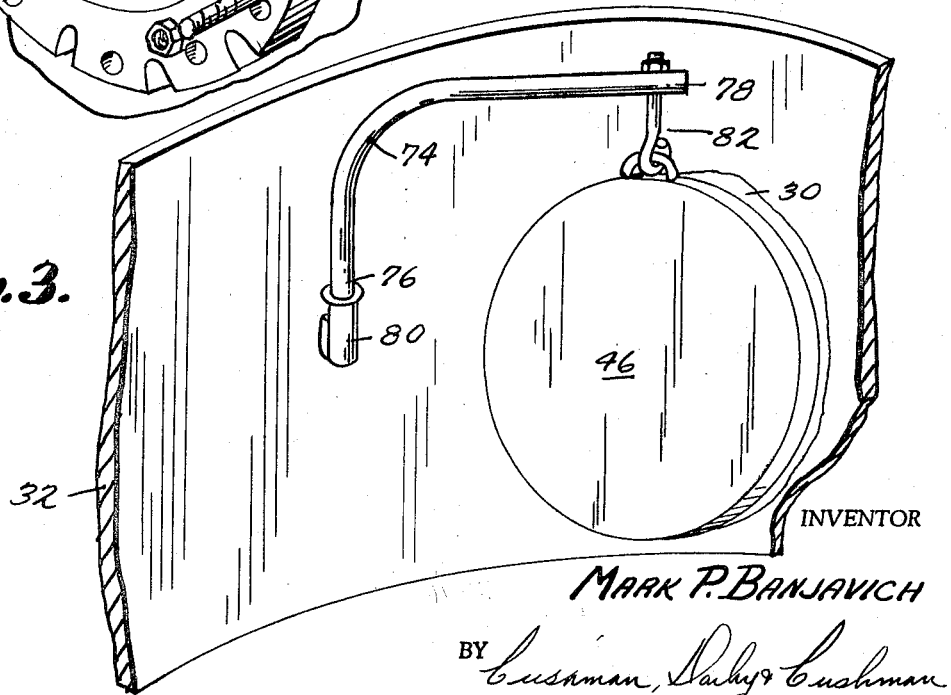

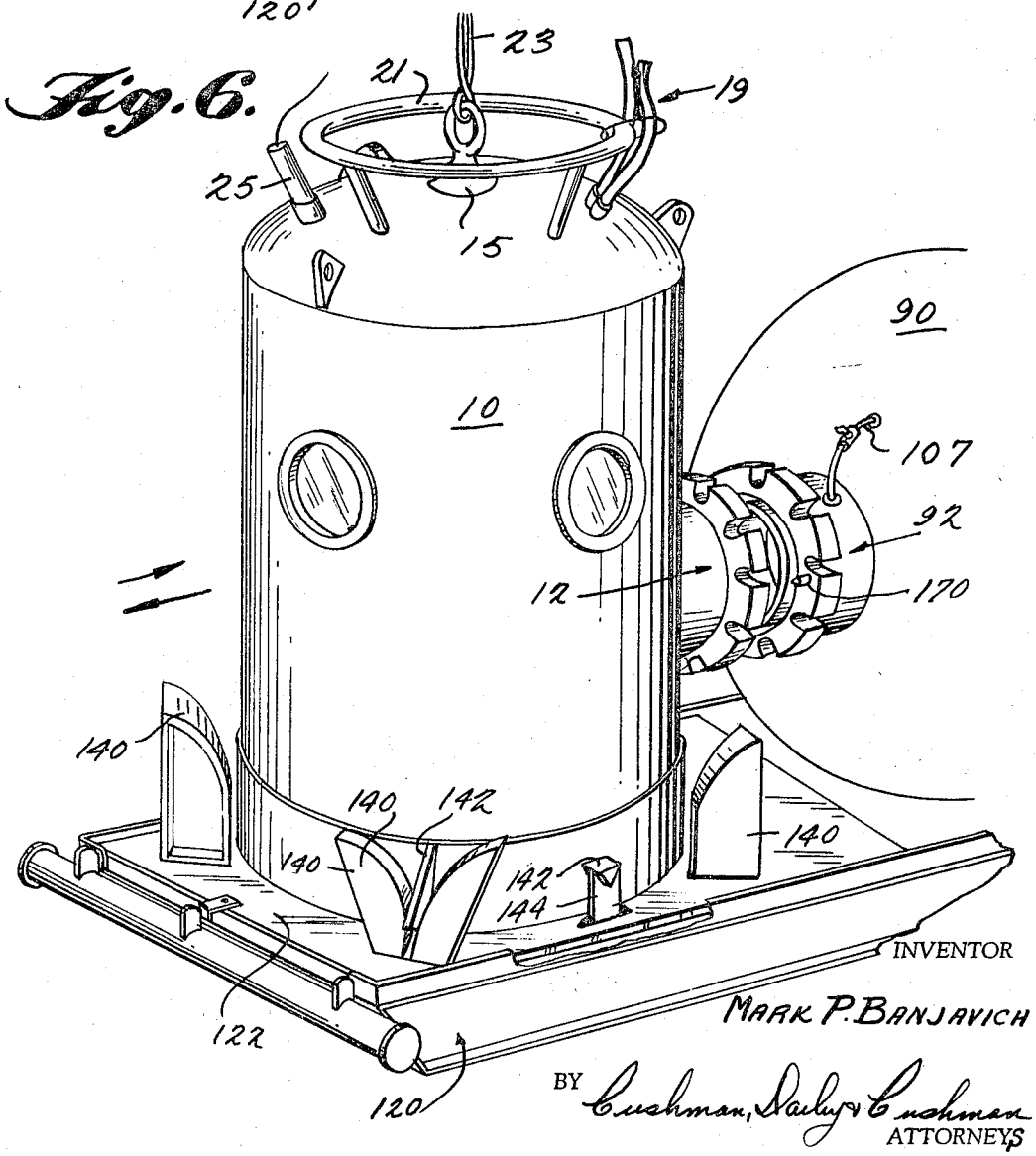

June 6, 1967 M. P. BANJAVICH 3,323,312
DIVING BELL AND DECOMPRESSION VESSEL COMBINATION AND IMPROVED
METHOD FOR HANDLING DIVING PERSONNEL
Filed March 14, 1966 6 Sheets-Sheet 5
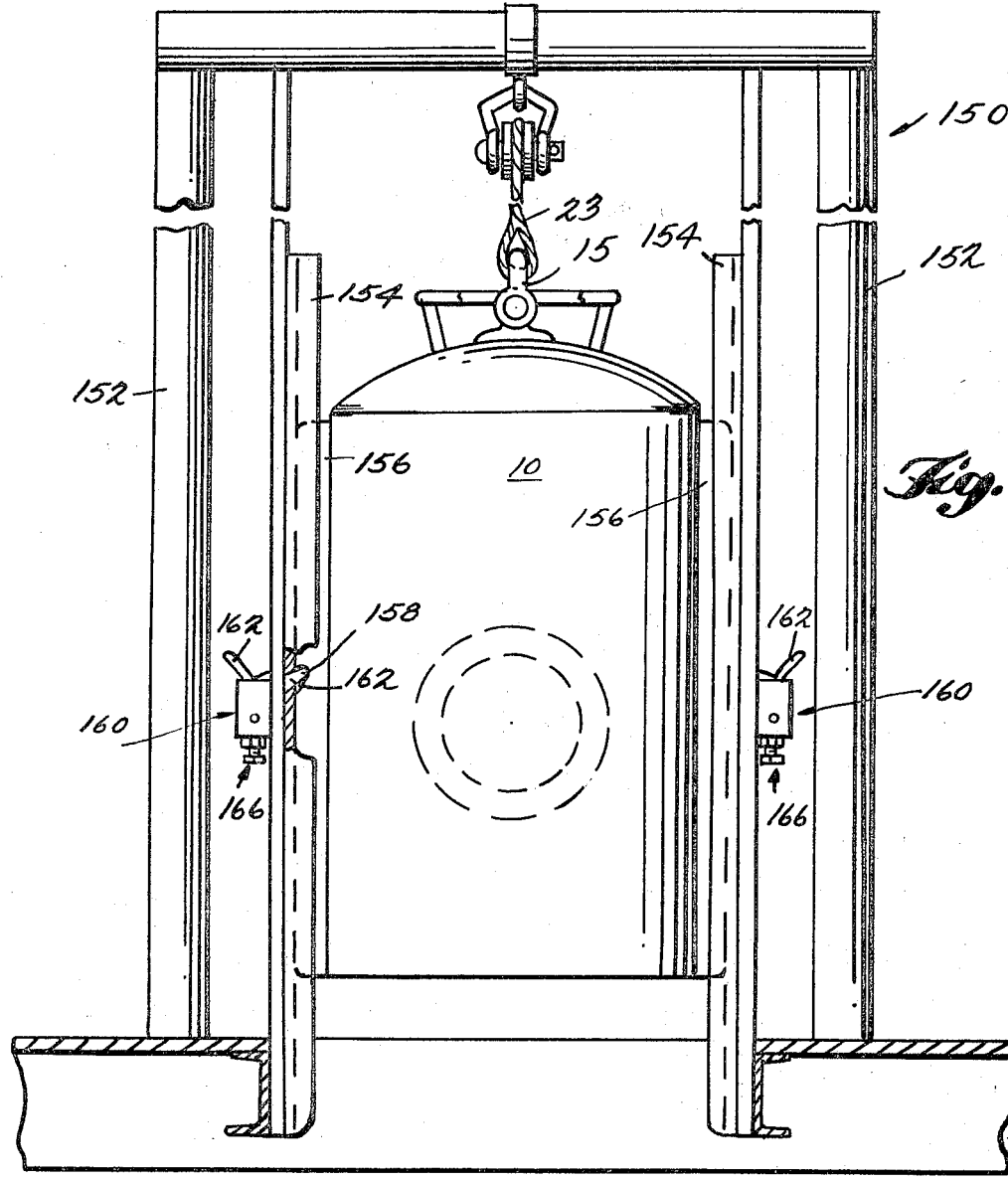
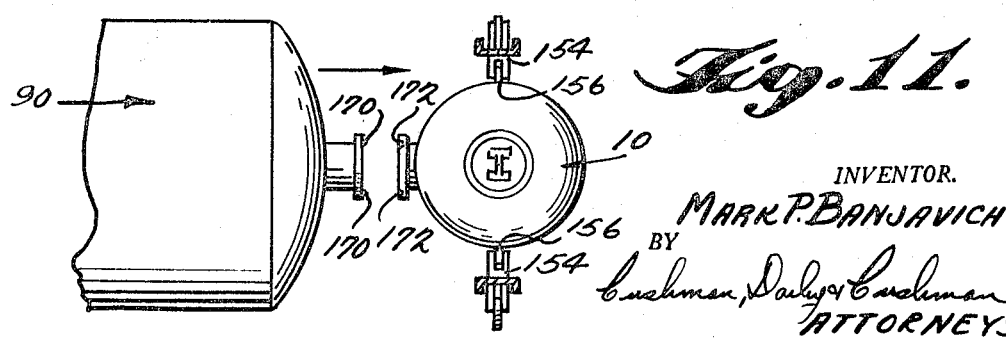
INVENTOR.
MARK P. BANJAVICH
BY
Cushman, Darby & Cushman
ATTORNEYS

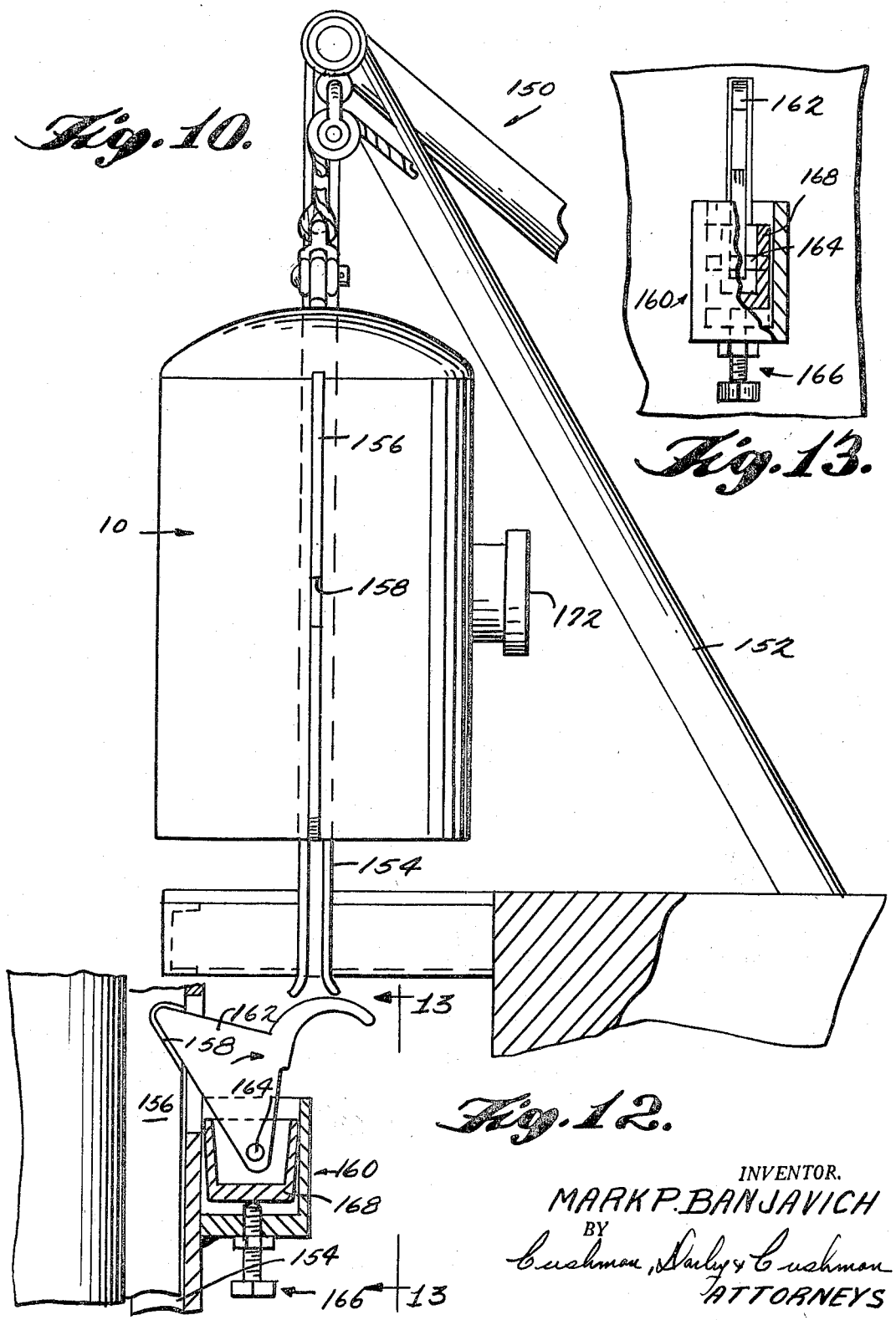

United States Patent Office 3,323,312
Patented June 6, 1967

3,323,312
DIVING BELL AND DECOMPRESSION VESSEL COMBINATION AND IMPROVED METHOD FOR HANDLING DIVING PERSONNEL
Mark P. Banjavich, 7600 West End Blvd., New Orleans, La. 70124
Filed Mar. 14, 1966, Ser. No. 533,975
11 Claims. (Cl. 61—69)

ABSTRACT OF THE DISCLOSURE

An improved diving system and method for handling divers at deep depths is provided. A diving bell vessel having bottom and side ports functions (a) to receive one or more divers for a diving operation, (b) as an underwater work station which remains dry while divers move back and forth to an underwater work site through an opened bottom hatch for the bottom opening of the bell, and (c) as a means for rapidly lowering and lifting divers to and from an underwater working level while maintaining the divers in a state of compression which is safe for the contemplated work level. The side port of the diving bell is provided with a hatch for closing and sealing the bell, and the hatch can be opened from outside of the diving bell. The improved system includes an above-deck vessel which holds divers for transfer into the diving bell and for decompression after they have been transferred out of the diving bell. The diving bell and above-deck vessel can be coupled together in a sealed relationship so that divers can be transferred back and forth while they are maintained at a safe level of compression. The system also provides for an improved method of handling diving personnel and for rendering aid in the event of accident.

This application is a continuation-in-part of application Ser. No. 439,665, filed Mar. 15, 1965, now abandoned.

This invention relates to diving equipment of the type used for placing diving personnel at working depths under water, and the invention is particularly concerned with diving bell constructions and with above-water pressure vessel constructions which can be used together in a novel method for handling diving personnel.

Diving bells have been constructed to carry divers to great underwater depths, and it is well known that diving personnel can be brought to comparatively high pressures for underwater work outside of a diving bell vehicle at a given depth. The usual diving bell provides for transportation of diving personnel to a deep depth, and a provision is made for an exit and entry of such personnel from and to the bell once it is at its operating level. Upon completion of an underwater project, the diving personnel re-enter the conventional bell, and the bell is then elevated to the surface. However, where the divers have been working at great pressures, it is necessary to slowly decompress them before they are released to atmospheric pressure conditions outside of the bell. Decompression has been accomplished within the bell by either lifting the bell at a very slow rate from its underwater point of operation, while adjusting its internal pressure, or by raising the bell rapidly to a surface level and then slowly adjusting the internal pressure of the bell to a surface pressure. The rate of decompression of diving personnel within such a vehicle depends upon the operating depth to which they have been pressurized and in which they have been working. As greater and greater depths are obtained, it is necessary to spend considerable lengths of time in decompressing such divers, and the length of time may vary from a number of hours, to even days, in decompressing individuals who have been operating at depths of several hundred feet. It can be seen that such a long time requirement for decompression necessarily limits the operating use of a given diving bell vehicle for transporting divers, and the time required for decompressing personnel has been one of the major costs in utilizing diving bell vehicles for underwater projects.

Another problem arises in the typical diving bell construction with respect to safety of personnel within the bell. Prior diving bells have provided no means of access to disabled occupants in the bell without seriously changing the pressure conditions within the bell. The occupants within a diving bell are affected by any rapid decrease in pressure, and serious injury, or even death, may result from a rapid releasing of pressure within a diving bell which is returning from a deep level of operation. Thus, in a typical diving situation, a disabled or stricken diver within a bell was not removed until the internal pressure of the diving bell was slowly lowered. A highly pressurized diver could not be subjected to a rapid change in pressure as this might have caused permanent injury or immediate death. As a result, stricken divers within diving bell vehicles could not be aided or removed from such vehicles until they had completed a long decompression cycle of a number of hours or days and only at that time could the bell be safely opened for removal or assistance of the occupants. Such delays could result in serious and permanent harm to the persons involved.

The present invention is directed to providing diving equipment which will permit a safer and more rapid use of diving personnel at underwater levels. In accordance with this invention, a diving bell construction is provided which permits personnel to be transferred to and from the bell while maintaining their operating depth pressure and without subjecting them to any rapid changes in pressure. The diving bell of this invention is used in combination with an above-deck pressure vessel which can be used as a compression and decompression chamber. Provision is made for rapidly coupling the two vessels together, and as a result, teams of diving personnel can be rapidly and safely handled in relays to and from an underwater work level. Savings in diving costs are realized by keeping a given diving bell vehicle in continuous operation for transporting teams of divers to and from work levels, without loss of time for decompressing, and in addition, divers can safely make more frequent dives by being maintained in a state of compression between dives in a vessel separate from the diving bell. Although it is recognized that attempts have been made in the past to couple vessels together, the prior attempts have been impractical and even unsafe for present day diving requirements.

The diving bell of this invention is of the type which includes a hatch through its bottom for permitting the exit and entry of divers out of and into the bell at an underwater level. In this type of construction, the bell is maintained at an internal pressure condition which is approximately equal to the water pressure at a work level, and the internal pressure of the bell prevents water from rising up into the bell when divers are using the bottom hatch. The bottom hatch is normally closed by a door which may be actuated from the interior or the exterior of the bell. In addition to the usual bottom hatch, the diving bell of this invention also includes a second opening which is placed through one of the vertical side walls of the dividing vehicle. The position of this second opening is important because its function is to provide an access means to the diving bell for transferring personnel or for rescuing personnel when the bell is in a pressurized condition and at an above-water location. The second opening or access means is constructed to be coupled to an adjoining vessel at an above-water level, and after the coupling has taken place, a transfer of divers into and out of the pressurized diving bell can be accomplished without changing the pressure conditions within the bell. By placing the access port on a vertical wall of the diving vehicle, there is no requirement for tilting the vehicle or manipulating the entire bell in any unusual movements which might result in the upsetting of equipment or divers contained within the vehicle. This is important when it is realized that the diving bells contemplated by this invention weigh in the order of approximately six tons and because of this weight factor any unusual movements of the entire vehicle would be very difficult and possibly injurious to the occupants of the vehicle. These difficulties and possible dangers are even greater where the diving vehicles are used in conditions of high seas and where all handling of such a vehicle must be carefully controlled to avoid danger or a loss of the vehicle. The above-deck pressure vessel which is coupled to the diving bell of this invention includes a port which cooperates with the access port of the diving bell to effect a sealed coupling of the two vessels. After a coupling has been made, a communication can then be made between the two vessels from the above deck pressure vessel and without any assistance from the occupants of the diving bell. The above-deck pressure vessel is preferably in the form of a device having a series of chambers sealed from one another and which may be operated to decompress or recompress divers, as desired.

In addition to the provision of a second port means in a particular position in a bell structure, the invention also provides for a guiding means associated with the above-deck equipment for supporting and guiding a diving bell and a pressure vessel into correct alignment for coupling. The guiding means assures a rapid and accurate placement of the dividing bell in precise alignment with the above-deck vessel, and as a result a quick attachment and communication can be made between the two vessels. From a practical standpoint it is essential that the diving bell be carefully handled when it is brought to an above surface position where there is much surface motion, such as is encountered on a floating barge or boat at sea, and the guiding means of this invention provides for a safe and sure handling of the diving bell. One form of guiding means provides for a rigid locking of a diving bell in a frame structure to prevent the bell from swinging or tilting while it is being surfaced, and this embodiment then provides for a movement of the above-deck vessel into a coupling position relative to the diving bell.

The novel apparatus of this invention further provides for an unusually rapid and safe method of handling diving personnel. The method of handling such diving personnel comprises a series of steps for transferring personnel from one pressure vessel to another vessel having the same internal pressure. The first pressure vessel can be used to prepare teams of diving personnel for underwater work at a given depth, and the second pressure vessel can be in the form of a diving bell vehicle used as an elevator for rapidly moving diving personnel to the requisite work depths. After divers have completed an underwater job, or have reached their limit for underwater exposure, they can be rapidly returned to the surface and placed in the above-deck pressure vessel for a rest or for a safe and slow decompression. When divers have been removed from the diving bell, subsequent teams of divers can be transferred into the bell immediately, and the bell can place them at an underwater work level without any delay. Furthermore, all of the transfers of diving personnel from one vehicle to the other take place without any danger to the divers and with little likelihood of damaging any of the extensive equipment carried within the diving bell. The position of the access port on a vertical wall of the diving bell, of the type described, together with the handling devices for supporting and guiding the diving bell into a coupled relationship with a pressure vessel, accounts for a practical system which can be used in all present day diving requirements whether in severe weather conditions at sea or in relatively quiet conditions offshore and inland.

The invention also provides for a method whereby stricken divers can be treated, as necessary, without waiting for a full decompression cycle before an opening and entry can be made into the diving vehicle. Medical personnel can be pressurized to the internal pressure conditions of a stricken diving bell and its occupants, and then a transfer of personnel can be made safely to or from the bell, while at the same time permitting immediate medical attention to the stricken occupants.

The diving apparatus of this invention has the further advantages of being easily constructed and very rugged and reliable in use. The access port means of the invention can be added to existing vehicles at a reasonable cost, and associated structures are provided for making the equipment safely and easily operable. Also, the access port and means for coupling the diving vessel with an above-deck vessel permits both vessels to be coupled in their usual working attitudes, and this means that neither vessel has to be subjected to any unusual movements which might harm the occupants of the vessels. This is especially important where divers within a diving bell are unconscious and where the bell must be carefully handled to prevent further injury to such stricken occupants.

These and other advantages will become more apparent in the more detailed discussion of the invention which follows, and in that discussion reference will be made to the accompanying drawings, in which:

FIGURE 1 is a sectional elevation of a diving bell incorporating the access tube of this invention;

FIGURE 2 is an exploded perspective view of the component parts which make up the access tube and its sealing door means;

FIGURE 3 is a view of the sealing door means as seen from the interior of the diving bell, and showing a support davit for supporting the weight of the door when it is opened;

FIGURE 4 is a view of the exterior of the diving bell when an above-deck pressurized vessel is attached to the diving bell for transferring personnel;

FIGURE 5 is a view of the interior of a decompression chamber showing a plurality of compartments within that chamber and illustrating the novel access port which is a part of the decompression chamber construction;

FIGURE 6 illustrates a guiding and aligning device for sliding a diving bell into correct alignment with a decompression chamber for coupling the two vessels together in a sealed relationship;

FIGURE 9 is an elevational view of an alternative guiding and aligning device for coupling the diving bell vehicle to the decompression chamber;

FIGURE 10 is an elevational view of the device of FIGURE 9 taken at a right angle from the FIGURE 9 view;

FIGURE 11 is a top plan view of a diving bell held in correct alignment by the device of FIGURE 9 and showing the relationship of a pressure vessel to the diving bell;

FIGURE 12 is a detailed front view of a locking mechanism used with the device illustrated in FIGURE 9; and FIGURE 13 is a side view of the mechanism shown in FIGURE 12.

*Detailed discussion of the invention*

Figure 7:
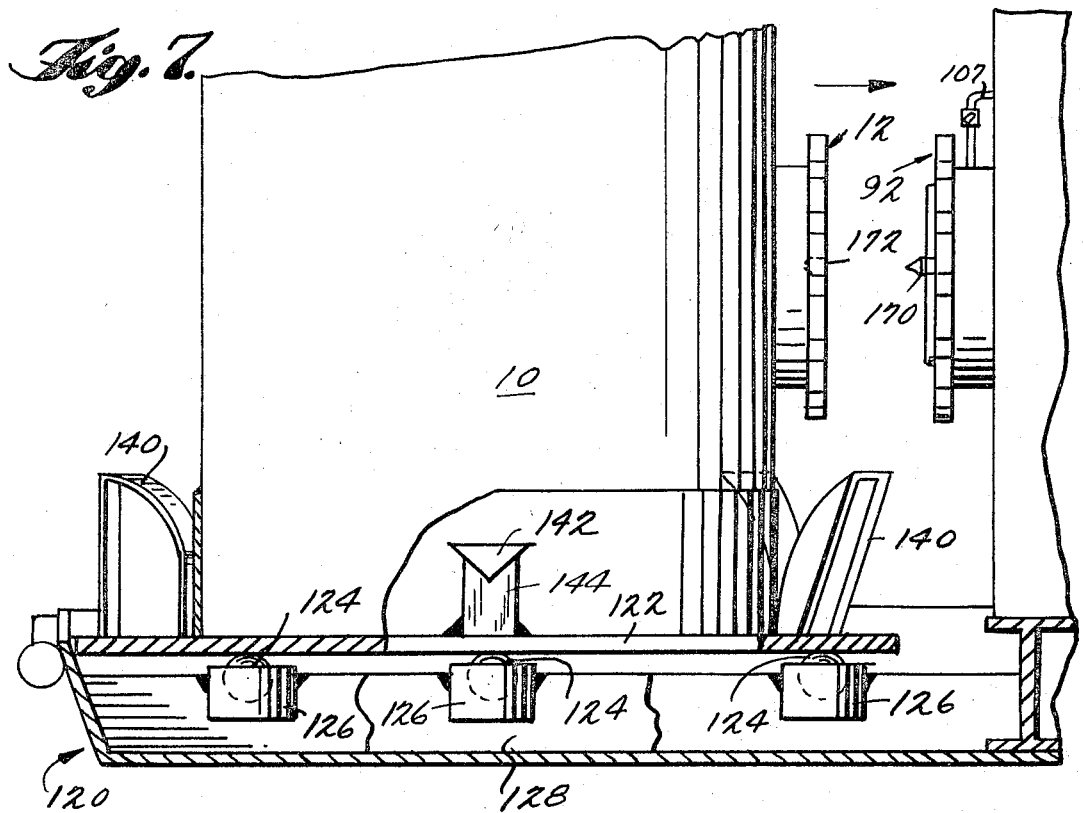
FIGURE 7 is an elevational section of the guiding and aligning device of FIGURE 6 and showing details of the device.

In the figures, the diving bell, or other submarine type of vessel, is indicated generally as 10, and a horizontally disposed passageway or access means to the vessel is shown at 12.

The basic diving bell may be of any suitable shape and size to carry one or more divers to the operating depths of the particular bell. Referring to FIGURE 1, the diving bell is shown as a generally elongated vessel which stands upright in use. The walls of the vessel are made of steel plate or any material suitable for withstanding the high internal pressures attainable in such a vehicle (as much as 500 lbs. per sq. inch), and the entire diving bell is constructed to be water-tight for its designed depth of operation. The diving bell may include external attachment means 14 which provide for cables or other hoisting means to be connected to the bell for raising and lowering the bell to selected depths in the ocean. Alternatively, a lifting pad eye 15 (as shown in FIGURE 9) may be attached to the top of the bell. A hatch 16 is provided at the bottom of the diving bell to permit normal exit from re-entry to the diving bell by diving personnel at the underwater work level. The hatch 16 includes a vertically disposed passageway which is shown as an upright tube 18 of sufficient diameter for a person to pass through in entering or leaving the bell. The passageway is sealed at its inner end by a watertight, pressure resistant door 20 which is normally closed during a dive and which may be operated from the inside of the bell by the latching mechanism 22. The latching mechanism 22 alternatively may be of a type which can be operated from either side of the door 20. The door is mounted on a hinge 24 for pivotal opening toward the interior of the diving bell when the latching mechanism is released. The air or gas mixture within the bell is brought to a pressure level which is essentially equal to the contemplated underwater work level pressure, and thus, water is kept from rising up into the interior of the bell when the hatch 20 is opened at the work level. In this manner, divers are free to leave the bell at the work level and to re-enter, as necessary. For deep dives, the divers may wear protective suits and utilize breathing apparatus during the entire dive, and the breathing gas mixture is provided from an above-water source through hoses going into the bell. However, it is also possible to provide an artificial breathing mixture within the bell itself so that breathing apparatus does not have to be worn inside of the bell. In either case an emergency reserve of breathing gas is carried under compression in a tank 17 which is a donut-shaped tank fitted in a protected position within the confines of the lower portion of the bell. Suitable conduits and valves (not shown) lead from the tank 17 into the bell so that the gas mixture can be used when necessary.

The basic diving bell also includes other features which make it operational, such as portholes 26 for viewing, ballast, and suitable connections and equipment for controlling the atmosphere and the pressure within the diving bell. As seen in FIGURE 6, air hoses and communication lines 19 can be connected between the bell and the surface in any conventional manner, and a support ring 21 is provided to secure the hoses and also to prevent a lifting cable 23 from fouling the hoses and their connections to the bell. An anchor or weight can be suspended from the bottom of the bell for holding it in position on an underwater floor. A closed circuit television camera 25 is mounted through the roof of the bell for monitoring the condition of the occupants. The diving bell also includes extensive equipment in the form of gauges, communication and breathing devices and tools which are to be used by the divers.

The access means 12 of this invention is used for transferring personnel to and from the diving bell whenever it is necessary to maintain the personnel in a desired pressurized condition. In this sense, the access means 12 may be used for normal transfer of personnel who are being carried to working depths and back again, but also, the access means is useful as an emergency entry to the diving bell if such entry is necessary. The access means 12 is in the general form of a port of sufficient size to permit the passage of a person through a wall of the diving bell. The access port may be formed through any vertical wall of the diving bell, and this position is important for maintaining the bell in its normally upright position at all times. In this way there is no danger of injuring personnel or damaging equipment, as would be the case if the bell were turned over or moved out of its upright position. It is likewise important that a separate hatch be located in the bottom of the diving bell for normal entry and exit at an underwater level, since an attempted exit from a side port would result in a flooding of the bell up to the level of such a side port.

The access port includes a passageway 28 which is formed by the tubular member or access tube 30 passing through an upright wall 32 of the diving bell. The access port may be of a cross-sectional configuration which is non-circular, but the tubular configuration shown is selected for ease of construction. The tubular member 30 is welded at 34 around its external surface where that surface contacts the wall 32 of the diving bell. In manufacturing the access means of this invention, a hole is cut through the wall 32, and the hole is made of a size and shape to receive the tubular member 30 within the hole and in engagement with the edges of the hole. Then the access tube 30 is welded to the wall 32 around the entire perimeter of the surface of the tube which engages the edges of the hole. The FIGURE 1 sectional view shows a reinforcing wall plate 36 which is placed against the wall 32 and around the position of the access tube. The wall plate 36 reinforces the wall and permits a stronger weld between the access tube 30 and the double wall made up of the plate 36 and the wall 32. The weld between the diving bell wall and the access tube passing through the wall is of sufficient strength to maintain the pressure resistant characteristics of the diving bell and to provide a water-tight seal around the access tube where it contacts the diving vessel wall.

The access tube 30 is mounted and fixed so as to protrude for a short distance into the diving bell chamber, and when so positioned the access tube has an inner end 38 opening into the interior of the diving bell and an outer end 40 which extends outwardly from the outside of the diving bell. The inner end 38 of the access tube 30 is preferably provided with an annular flange 42 which is welded to or otherwise formed on end 38 of the access tube. The inner annular flange 42 has a face 44 which is a finished surface for tightly engaging a finished surface of a door 46. The door 46 is mounted against the inner end of the access tube 30 for sealing the tube from outside fluid pressure and for maintaining the internal pressure of the diving bell. The face 44 of the annular flange 42 further includes an annular groove 48 extending around the entire face 44, and a gasket 50 is placed within the groove to effect a tight seal when the door 46 is closed. The gasket may be a ring gasket of neoprene rubber and may have the square cross-sectional configuration shown in FIGURE 1.

The door 46 is held in a closed, sealed, relationship to the inner end of the access tube by a latching means, and FIGURE 2 shows an exploded view of the elements which make up the door latching means. It is important that the door be accessible by personnel outside of the diving bell in order that emergency entrance may be made into the diving bell to aid or remove disabled occupants. Therefore, the latching mechanism is actuated from the outer end 40 of the access tube. The latching means includes a shaft or bolt member 52 which is affixed to the door 46 and which projects outwardly from the door toward the outer end of the access tube. The projecting end 54 of the bolt is threaded, as at 56, so as to receive a nut member 58. The nut 58 includes internal threads 60 which match the external threads 56 of the bolt. Interposed on the bolt between the nut 56 and the door 46 is a freely sliding backing member 62 which is mounted at essentially a right angle to the bolt 52 so as to extend across the opening of the passageway 28. The backing member has a hub element 64 with two or more opposed arms 66 extending radially outwardly from the hub. When two arms 66 are used, the arms extend outwardly from the hub at position 180° from each other, as shown. The hub 64 includes a bore 68 through its longitudinal central axis, and the bore 68 is of a sufficient diameter to permit the free movement of the backing member along the bolt 52 when the hub is mounted on said bolt. The radially extending arms 66 are formed integrally with, or rigidly attached to, the hub 64 so that the backing member 62 will present a strong bracing element against which the door 46 may be tightened by means of the bolt 52 and the nut 58. Stop members 70 are welded to the inner wall of the access tube 30 in positions 180° from each other so as to engage and stop unlimited movement of the backing member 62 toward the door 46. The stop members 70 are shown as having slots 72 for receiving the terminal ends of the backing member 62. The slots 72 prevent any turning movements of the backing member when it is placed with its ends against the stop members 70 and tightened into that position. The stop members 70 may be in the form of a flat projection having no slot, or in the form of a continuous ridge running around the inner surface of the access tube, but it is preferred that they be in the form shown to assure a more stable engagement of and a better release of the latching mechanism.

As shown in FIGURE 3, the inner door 46 also includes a means for supporting the weight of the door when the door is pushed open for an entry into or exit from the diving bell. The supporting means is shown in the form of a davit 74 which includes a base portion 76 and a door carrying end 78. The base portion 76 of the davit is mounted for pivotal swinging movement on a vertical axis in the base receiving member 80 which is rigidly mounted and affixed against an inner wall of the diving bell. The other end of the davit includes linking members 82 which connect the door 46 to the davit. When the door is moved to an open position, the davit supports the weight of the door and permits the door to be swung into the diving bell without dropping or injuring the personnel within the chamber. Also, the davit is mounted to swing the door into the diving bell a sufficient distance for the latching mechanism on the outside of the door to clear the access port.

The inner door 46 can be closed and sealed by swinging the door flush against the sealing face 44 of the inner flange of the access tube. The bolt 52 is preferably an integral part of the door and projects outwardly toward the outer end of the access tube, thereby permitting a mounting of the backing member 62 onto the projecting end of the bolt. The backing member is moved toward the door and rotated until the terminal ends of its arms engage the stop members 70. A flat washer 84 is placed over the bolt end, and the nut 58 is threaded onto the bolt until it is stopped by the backing member. The threads 56 on the threaded bolt end extend far enough down the bolt from its projecting end to allow the nut to be tightened against the backing member. In actual practice, a better seal is effected by raising the pressure of the atmosphere within the diving bell beyond the pressure outside of the bell, and then the nut can be further tightened to hold the door against the face of the flange 42. Of course, when dives are being made the pressure within the diving bell is adjusted in accordance with the depth of dive contemplated, and the sealing door with its latching mechanism has been found to provide a very effective seal for all operational depths of the diving bell.

To permit access to the diving bell without releasing the pressure within the bell, the access tube is further provided with a coupling means at its outer end 40 for attaching and locking the bell to another vessel. The coupling means is shown in FIGURES 1 and 2 as including an annular flange 86 which is formed integrally with, or affixed to, the outer end of the access tube 30. The annular flange 86 includes a plurality of spaced slots 88 about its periphery for receiving bolts which hold the diving bell in tight engagement with a similar flange carried by another vessel.

Referring to FIGURE 4, there is shown a general view of the diving bell 10 attached to an above-water pressure vessel in the form of a recompression and decompression unit 90. This view illustrates the coupling of the diving bell to a pressure vessel by merely placing the bell adjacent to the decompression chamber and bolting the two vessels together by a correct alignment of the flange 86 of the diving bell with a similar flange 94 carried on an access tube means 92 of the pressure vessel. The pressure vessel may be of a type having one or more internal compartments in which pressure may be regulated to permit a diver to go through a gradual decrease or increase in pressure. The pressure vessel of this invention includes the tube member 92 which serves as an access means for communication with a diving bell, and as already discussed, the tube member 92 includes a flanged mounting means 94 which latches to the coupling means 86 of the diving bell. Peripheral slots or openings about the flange 94 mate with the slots 88 of the diving bell mounting means, and the two units can be coupled tightly together by bolts 96 which are placed through the slots of the mated flanges, as shown in FIGURE 4. Since the access tube 30 of the diving bell is placed in a vertical side wall of the diving vehicle, a coupling with the pressure vessel is more easily obtained, and there is no necessity in upsetting the diving bell from its normal upright position.

Referring to FIGURE 5, there is shown a diving bell attached to a pressure vessel and the vessel is cut away to illustrate a plurality of internal compartments. The pressure vessel may have any desired number of compartments, but two major compartments 100 and 102 together with an entry compartment 104 are illustrated. Each of the compartments can be separately sealed from adjoining compartments and from the atmosphere so that pressure conditions can be carefully regulated and controlled within the individual compartments. As an example of compartment arrangement for use with the present invention, the compartment 100 can be maintained at a relatively high internal pressure for transferring divers to and from an attached to diving bell. The pressure conditions within the compartment 100 would be maintained at the pressure level within the diving bell, and these conditions would approximate the underwater pressure at which the divers are to be transported for working. The maintenance of a high pressure within the compartment 100 permits divers to be removed from an attached diving bell and to be placed within the compartment 100 without subjecting them to a rapid or immediate change in pressure. Likewise divers can be held in readiness within the compartment 100 for being transferred to an attached diving bell which has a high internal pressure; and in this manner, teams of divers or single divers can be transferred back and forth between the diving bell and the compartment, as required. The second compartment 102 may be controlled to an intermediate pressure level or it may be used as a compartment for slowly adjusting pressure conditions on given divers. Preferably the second compartment 102 is used as a decompression compartment for slowly relieving the pressure on a diver who has been exposed to the maximum permissible underwater pressure conditions. This decompression process may take a number of hours or even days, depending upon the depth to which the diver has been working. It will be appreciated that there is a substantial advantage in placing divers in a separate decompression chamber so that the diving bell can be kept in continuous use in relaying other divers to and from a working site. The compartments 100 and 102 are constructed to provide for a control of the atmosphere composition as well as pressure conditions, and suitable valving and control devices are associated with each compartment for such regulations. In addition, the separate compartments include living accommodations for divers, such as air conditioning and bunks so that the divers may be comfortable during their relatively long stay within the separate compartments. An air tight door 106 is positioned on the inner end of the access tube 92 of the pressure vessel so that the pressure vessel can be kept sealed from external atmospheric conditions when there is no diving bell attached to it. When a diving bell is attached, as shown in FIGURES 4 and 5, the pressure level within the combined tubes 12 of the diving bell and 92 of the pressure vessel is adjusted to substantially equal the pressure within the diving bell or within the compartment 100. This pressure regulation is accomplished by means of a suitable pipe connection 107 leading through a wall of the access tube 92 of the decompression vessel and connected to a source of air or gas under pressure. Once the pressure has been adjusted within the combined access tubes, the door 106 in the compartment 100 can be opened from within that compartment for the beginning of an entry into the diving bell. Then one of the divers, or other persons, in the compartment 100 can crawl into the passageway formed by the two access tubes and open the door 46 of the diving bell by removing the external nut 58 and the cross bar 62. At this point, the door of the diving bell can be swung open and a complete communication is formed between the diving bell and the compartment 100 of the pressure vessel. Divers may then leave the diving bell for a reset or a decompression cycle within the pressure vessel, and fresh divers may enter the diving bell for ultimate lowering to an underwater work level. After the exchange of divers has been made, the door of the diving bell is resealed by one of the remaining occupants of the pressure vessel, and then the door 106 of the pressure vessel is closed and latched. After this, the pressure within the combined access tubes can be released, and the bolts 96 removed for separating the two vessels. Thus, there is provided a means for exchanging diving personnel between two vessels which are coupled together and there is no pressure change in this transfer which will harmfully affect the diving personnel. Furthermore, the transfer can be made with maximum safety and comfort to the occupants of the diving bell.

As already indicated, the compartments 100, 102 and 104 are sealed from one another so that separate pressure conditions can be established in the separate compartments. For this purpose, single or double doors 108 may be positioned between the separate compartments. The compartment 104 may serve as an entry compartment to the remainder of the pressure vessel 90, and this compartment may be provided with a door 110 which seals that compartment from the atmosphere. When an entry is to be made through the compartment 104, a person enters the compartment and seals the door 110. Then the pressure in the compartment is raised to match the pressure level in compartment 102. When the pressures have been equalized, the door 108 may be opened, and an entry may be made into the compartment 102 without affecting the pressure within that compartment.

Figure 8:
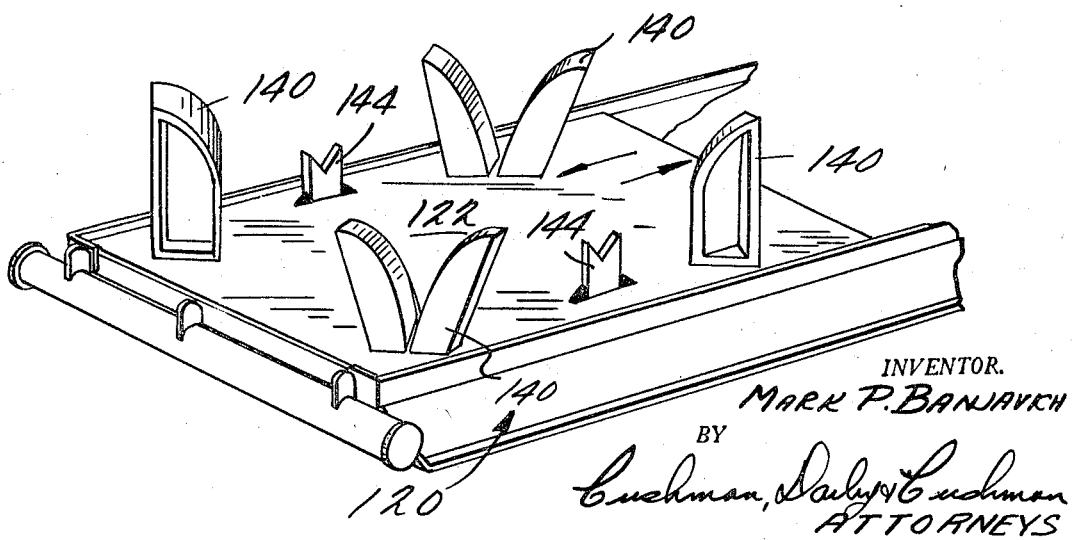
FIGURE 8 is a perspective view of the guiding and aligning device of FIGURE 6 with the diving bell removed to show detail.

FIGURES 6 through 8 disclose one form of guiding and supporting means which may be used in combination with the two vessels of this invention for facilitating a coupling and uncoupling of the two vessels. The guiding and supporting means may include a guideway 120 which is attached to one end of the pressure vessel 90. The guideway 120 is shown in the form of a pair of spaced beams extending outwardly from an end of the pressure vessel which includes the access port 92. Positioned within the guideway and mounted for movement toward and away from the pressure vessel is a supporting carrier 122. The supporting carrier is illustrated in the form of a substantially flat plate mounted on bearing members 124 which are contained within pockets 126 formed in a base portion 128 of the guideway 120. The bearing members 124 may be of any sufficient number to support the weight of a diving vehicle and its occupants while still providing for an easy movement of the entire carrier toward and away from the pressure vessel. When it is desired to couple the diving vehicle to the pressure vessel, the diving vehicle is lowered onto the supporting plate 122 by any suitable hoisting equipment which moves the vehicle to and from its underwater work levels. Once the diving vehicle is placed upon the plate 122, the entire plate may be moved toward the pressure vessel. The entire carrier 122 may be moved toward and away from the pressure vessel manually.

A further feature of the guiding and supporting means, as shown in FIGURES 6 through 8, includes aligning devices for initially placing the diving bell into a correct position on the supporting plate 122. The relatively large upright members 140 are fixed on the carrier and in positions to surround the outer surface of a diving bell received upon the carrier 122. The projecting members 140 are curved outwardly as shown to assist in the vertical alignment of the diving bell with the carrier as the bell is being lowered onto the carrier. Certain of the members 140 may be arranged in pairs to receive alignment fins 142 carried at the lower part of the diving bell for initially fixing the bell in an aligned position. Additional aligning members 142 are carried by the lower end of the diving bell for a final alignment of the position of the bell relative to the pressure vessel. Receiving members 144 are welded to the carrier to engage the projecting members 142 for precisely positioning the bell on the carrier.

An alternative supporting and guiding means is illustrated in FIGURES 9 and 10, and this alternative means includes a lifting and guiding frame 150 for handling the diving bell above the deck of a vessel, such as a barge, boat, offshore platform. The frame 150 is mounted in a fixed position over an opening in the deck of the vessel so that the diving bell can be lifted or lowered between its underwater positions and above water position. The frame includes leg members 152 which are of a sufficient dimension and strength to support the diving bell in an upright position above the deck of the ship for coupling to a pressure vessel on the deck. Since the frame 150 is mounted on the deck in a fixed position, it is necessary that the pressure vessel 90 be mounted on runways or skidways so that it can be moved toward and away from a diving bell held within the frame 150. The means for moving the pressure vessel may include a runway system having tracks for receiving runners which are attached to the pressure vessel, and the tracks may be lubricated. The advantage in this system resides in the placement of a diving bell, with all of its attached cables, hoses, and anchor, into a position which requires the least amount of manipulation of the bell. With the large and heavy equipment in use today, there is a real problem in handling such a vehicle once it is brought to surface, and by reducing required movements of the bell, there is less danger of fouling or breaking lines and connections.

The frame includes a locking means for positioning the diving bell in an aligned position relative to the pressure vessel. The locking means include vertical guide channels 154 which receive upright guiding bars 156 mounted in spaced positions on the outside surface of the diving bell. FIGURE 11 illustrates the positions of the guide bars 156 as being 180° from one another on the diving bell, but other spacings and numbers of bars may be used. The guide bars are in the form of flat metal members which can be received within guide channel members 154. The guide channels are affixed in upright positions on the frame 150, and include channels of a sufficient depth and width to receive the particular guide bars which are attached to a diving bell. The lower ends of the guide channels may be flared outwardly so as to present a broader receiving channel into which the diving bell can be guided when it is first raised from an underwater position to an above-deck position. Also, the guide channel members 154 extend downwardly below the deck level for a sufficient distance to initially receive the upper ends of the guide bars while the lower end of the bell and its attached anchor are still in the water. This feature assures a more stabilized attitude of the bell while it is being hoisted in the frame 150. This is especially important at sea, and with the apparatus of FIGURES 9 through 12, free swinging movements of the bell are prevented. The frame 150 also includes a block and cable means for lifting and lowering a diving bell, and this means may be connected to a power operated winch or to any other device for controlling the length of cable connected between the diving bell and the guide frame means.

The guide bars of the diving bell include notches 158 for receiving locking devices 160 carried by the guide channels of the frame means. The locking devices 160 provides for a rapid and precise positioning of the diving bell at a correct level for coupling to a pressure vessel, and the bell can be held in the precise position until the pressure vessel has been moved up to the bell. As illustrated in the detailed drawings of FIGURES 12 and 13, each of the locking devices is attached to one of the guide channels at a level which will engage a pawl member 162 with the notch 158 of an associated guide bar. The pawl member can be manually pivoted about its point of attachment at 164 so as to engage or disengage the guide bar which is associated with the particular pawl member. In addition, the locking means 160 includes a height adjustment means 166 for adjusting the vertical level at which the pawl engages the notch of a guide bar. The adjusting means 166 is illustrated in the form of an adjusting screw which lifts and lowers a supporting structure 168 for the pawl. By lifting and lowering the supporting structure 168 with the adjusting screw, the pawl can be made to engage guide bar notches at a very precise level for accurate coupling of the diving bell to a pressure vessel. It can be seen that the notches 158 are designed to receive the pawls in locking engagement only when a downward force exists on the pawl. The pawls can be easily disengaged by lifting the diving bell so as to move the pawls outwardly.

The top plan view of FIGURE 11 shows a diving bell 10 held within the guide channels 154 of a guiding and supporting frame means, and a pressure vessel 90 is illustrated as being in proper alignment with the position of the diving bell. The pressure vessel is mounted on skids that fit into lubricated channel tracks affixed to the deck of a ship and a hydraulic cylinder and piston means, or other equivalent actuating means, serves to move the pressure vessel toward and away from the guide frame within which a diving bell is contained. Also illustrated are projecting members 170 in the form of alignment pins attached to the face of the access port means carried on the pressure vessel. These alignment pins can be tapered to a conical shape, as illustrated, so that they will easily insert into mating, receiving holes 172 contained within an opposing face of the driving bell access port means. The alignment pins assure a correct alignment of the decompression chamber with the diving bell when the chamber is moved toward the locked position of the diving bell. Minor adjustments between the two vessels are made by the reaction of the alignment pins against receiving surfaces within the alignment holes carried by the diving bell coupling means.

The guiding and supporting means shown in FIGURES 6 through 8 is useful for inland operations where the above-deck surface is stable. However, it has been found that the guiding and supporting means shown in FIGURES 9 through 13 is especially useful at sea where a deck is constantly moving from wave action. The diving bell normally has an anchor suspended from its bottom, and with the apparatus of FIGURES 9 through 13, there is no requirement for removing the anchor prior to the coupling of the diving bell with a pressure vessel. This saves time and much difficulty in coupling the two vessels. With the apparatus of FIGURES 6 through 8 it is necessary to remove the anchor prior to placing the bell on the carrier.

Although the apparatus which has been described above is adaptable for a number of underwater operations, it has been found that a novel method of handling diving personnel can be accomplished with the improved apparatus of this invention. As is well known, the costs for diving operations are very high, and a major factor in the high costs is the relatively short time in which divers can work at a deep depth because of the extreme temperature conditions. It is apparent that costs could be diminished if divers could be rested and returned to a work site more frequently during a period of time in which they are maintained in the required state of compression for the particular work site. The present invention provides for a diving bell which remains dry while divers exit and enter for periods of work at a deep underwater level, and in this sense, the divers can rest within the bell for periods of time while at a given level. The comfort and safety of divers within a bell at a deep level is largely a result of providing a hatch in the bottom of the bell which permits egress and entrance without any flooding of the bell. However, the invention combines with this feature, the further advantage in being able to rapidly return divers to the surface and to safely transfer them to comfortable quarters for longer periods of rest and before resuming diving. Also, savings are realized when the diving bell vehicle is kept in constant operation for relaying teams of divers to a given site so that work will continue until the job is finished. The present invention provides for transferring teams of diving personnel to and from an underwater depth level while maintaining a diving vehicle in substantially continuous work use and while obtaining a maximum frequency of dives for each team of divers. The method of handling divers is completely safe and does not subject the divers to differences in pressure even though they are removed from the diving bell immediately upon returning to the surface, whether for a rest or for decompression.

The method of this invention includes an initial step for preparing a first diver or team of divers for movement to an underwater work level. This step requires a compression of the diver to the anticipated underwater pressure, and this compression may be made in either the chamber 100 of the pressure vessel or in the diving vehicle itself. Where the compression is effected within the pressure vessel, it is necessary to couple the diving vehicle to the pressure vessel in the manner described above. After the coupling step, there is a step of raising the pressure within the diving vehicle and within the passageway formed between the two vessels to a level which is substantially equal to the pressure level of the diver in chamber 100. Then the passageway between the two vessels is opened, and the diver can be transferred into the compressed atmosphere of the diving vehicle. From there the method requires a movement of the diving vehicle to a working depth and further steps require the preparation of an additional diver or teams of divers within the pressure vessel. Upon return of the diving vehicle from its first dive, divers can be exchanged, and the first diver may rest within the chamber 100 of the pressure vessel. After a period of rest the first diver will be ready to return to the work level upon a subsequent dive of the diving vehicle.

When the diving vehicle itself is used as the location for the initial step of preparing a diver, the diver is sealed into the vehicle without coupling the vehicle to any other vessel. Then the pressure within the diving vehicle is raised to the anticipated work level pressure. After this the remaining steps are the same as described above, and the diving vehicle can be coupled with the pressure vessel for transferring divers back and forth. Of course, in the methods of this invention, the returned divers may also be moved into the chamber 102 for a decompression of the divers.

This invention also provides for a method of rescuing personnel from a diving bell having a high internal pressure, and this method is further characterized by the safety with which the occupants of a diving bell are handled during such a rescue transfer. As already indicated, the diving bell can be raised rapidly to an above-water level while maintaining the internal pressure of the bell at the high level to which the divers are adjusted. Then, the bell is coupled to an above-deck pressure vessel and this coupling step is accomplished without upsetting the bell from its normal upright position and without causing the stricken occupants to be injured by falling or tumbling around in the diving bell. The final step of a rescue requires the unsealing of the passageway between the coupled vehicles, from the exterior of the diving bell, so that access may be made to the bell for the purpose of rendering aid and removing the stricken occupants. The capacity of gaining access from the exterior of the bell is especially important where the occupants of the bell are unconscious and unable to assist in their own removal. For this reason the position of the access port is even more critical since the door must be opened inwardly into the bell and without further injuring unconscious occupants who would be laying on the bottom floor of the bell.

Thus, it can be seen that the methods of this invention permit substantial savings and safety in handling divers. The pressure vessel on the surface may be utilized as a high pressure waiting room where diving personnel can be held in readiness for making a dive. When it is time for a team of divers within the bell to be replaced by a new team of divers, the diving bell can be brought rapidly to the surface while maintaining the interior pressure within the bell at its operating depth level, and the bell can be attached to the waiting decompression chamber for an exchange of diving teams. Then the diving bell can be resealed and returned rapidly to its operating depth with no loss of time for decompression of diving personnel. In this manner, a greater amount of work may be accomplished with a single diving bell having the access port of this invention, and there is no necessity for having a number of diving bells on hand in different stages of compression or decompression in order to carry out a diving operation under water. The better utilization of diving time results in considerable savings in the operational costs of diving. By using the access means and lock-on device of this invention it is possible to exchange divers in a single bell more rapidly, and to remove injured divers from a bell for treatment while at the same time being able to put the diving bell back in service immediately.

The diving bell and access means of this invention are constructed from any suitable metal, alloy or material which is suitable for withstanding the pressures contemplated. Sealing means are provided to adequately seal the inner door of the access tube from expected external pressures, and the outer flange mounting means is bolted to a matching flange on another vessel so as to establish a sealed coupling between the two vessels. This latter sealing is accomplished by the tight bolting of the two flange members together, but it may be supplemented by gasket devices, or the like, included in the engaging faces of the flange members. Also, the diving bell may include additional safety devices such as safety belts or harnesses which can be used by divers to strap themselves in when the diving bell is being buffeted severely. Of course, if a diver has strapped himself in and then becomes unconscious, it is all the more important that access to the bell should be possible from outside of the bell.

In addition to the use of this access port on underwater type vessels, the access port and mounting means may be used on any vehicle, room, or chamber having an internal pressure which is to be maintained at a constant level. The access port, with its external mounting means, permits the attachment of a vessel or chamber to the port, and permits entrance into and exit from any chamber where the pressure is to be maintained at a substantially constant level.

Also, the diving bell of this invention may be used in combination with a plurality of above-deck pressure vessels. For example, two pressure vessels having access ports may be spaced apart on a deck with their access ports facing one another and with sufficient space for a diving bell to be lifted into place between the two vessels. In such a system the diving bell may be coupled to either of the pressure vessels and then rotated 180° for coupling to the other of the pair of vessels.

Other changes in this invention will become apparent to those skilled in the art, and such changes are intended to be included within the scope of the invention.

What I claim is:

1. A diving system for handling divers under pressure and for lowering and lifting divers to and from an underwater work level from an above-water marine platform or other marine vehicle, said system comprising:

an above-deck pressure vessel for holding divers who are to be transferred to an underwater work level and for holding and decompressing divers who have been received from previous diving activities, said above-deck pressure vessel having a horizontally disposed passageway opening through an essentially vertical side wall portion of the vessel for transferring divers into and out of the vessel, and a hatch means to close said passageway and to seal the above-deck vessel from an outside atmosphere, a diving bell which functions to handle divers while in a compressed condition and to protect divers under pressure without exposure to an outside atmosphere while above water, and which also functions to provide an underwater work station from which divers may move directly into and out of a water environment, said diving bell, in upright orientation, having side and bottom walls, with a horizontally disposed entrance and egress passageway opening through an essentially vertical portion of said side wall and a hatch operable from outside the diving bell for sealing said horizontally disposed passageway, and a vertically disposed egress and entrance passageway opening through said bottom wall and a hatch for fluid sealing said vertically disposed passageway, said last named hatch being operable from within the diving bell, the passageway through said side wall portion being above a floor level of said diving bell at a sufficiently high level to provide for a transfer of divers to and from the diving bell when at an above-water position and when the diving bell in said upright orientation is coupled to said vessel with said side wall passageways horizontally aligned, and said bottom passageway providing for a movement of divers directly into and out of a water environment without flooding the diving bell when said diving bell is functioning as an underwater work station at a deep level below the surface of a body of water, cooperating coupling means on said diving bell and on said above-deck pressure vessel operable from outside of the bell to secure said side walls relative to one another for aligning said side wall passageways in sealed relation to each other when the diving bell is at an above-deck level, whereby the hatches in said side wall passageways may be opened and divers may move horizontally between said diving bell and said vessel while the interiors of the same are maintained at substantially the same pressure, thereby permitting the transfer of divers while under compression and without any adverse effects, said passageway through said side wall portion of the diving bell further permitting the removal of any stricken divers from within the diving bell who may be lying on a bottom hatch of the diving bell in an unconscious state, and means for lowering and lifting said diving bell in said upright orientation to and from an underwater work level and for moving said diving bell in said upright orientation into a position for being coupled to said above-deck pressure vessel.

2. The system of claim 1 and including:
guiding and aligning means for aligning said diving bell with said pressure vessel and for bringing the bell and the vessel together for a coupling relationship.

3. The system of claim 2 wherein said guiding and aligning means comprises:
a support frame for receiving and lowering said diving bell from and to its underwater working levels, said support frame being mounted in an above-deck position adjacent to said pressure vessel,
means for locking said diving bell in said support frame with the horizontally disposed entrance and egress, passageway of said diving bell in alignment with the horizontally disposed passageway of said pressure vessel, and
means for moving said pressure vessel toward and away from said diving bell in said support frame for coupling and uncoupling said bell and said pressure vessel.

4. The system of claim 3 wherein said means for locking said diving bell in said support frame comprises:
upright guide channels carried by said support frame for receiving guide bars attached to said diving bell, said upright guide channels being spaced from one another to receive the diving bell therebetween,
vertically disposed guide bars fixed to the outside surface of said diving bell and spaced from one another to mate with the spaced guide channels of said support frame, and
locking devices carried by said guide channels for engaging the guide bars of said diving bell when the bell is lifted to an aligned position with said pressure vessel.

5. The improvement of claim 4 wherein said locking devices comprise pawl means which are mounted on said guide channels and movable into and out of the guide bar receiving portions of said channels, and wherein said guide bars include notches for receiving said pawl means, said notches being positioned relative to said pawl means to receive said pawl means when said diving bell has been lifted to an aligned position relative to said pressure vessel.

6. The improvement of claim 5 wherein said pawl means are vertically adjustable to provide for a precise alignment of the two vessels.

7. The system of claim 2 wherein said guiding and aligning means comprises:
a guideway attached to said pressure vessel and extending outwardly therefrom at an end of said pressure vessel which includes horizontally disposed passageway,
support means carried within said guideway and movable toward and away from said pressure vessel for supporting said diving bell and for moving the same toward and away from said pressure vessel.

8. A system in accordance with claim 1 wherein means are provided on the marine platform, for supporting and guiding said diving bell and pressure vessel relatively toward one another for aligning the horizontally disposed side passageways thereof in order to secure and seal the same with said coupling means.

9. In apparatus for handling diving personnel and for safely transferring such personnel to underwater depths which require a decompression of the divers upon return from such depths, the improvement comprising the combination of:
a diving vessel for receiving diving personnel and for transporting such personnel to and from a working depth, said diving vessel being fluid sealed to maintain its interior at a required pressure for operation at the working depth level, said diving vessel being of the type having a bottom port for exit and entry of divers at the underwater work level, and wherein said vessel includes an access port means through one of its vertical walls for transferring diving personnel to and from the diving vessel while maintaining an operating pressure within the diving vessel, said access port means having a mounting means for attaching said diving vessel to a second vessel,
a second vessel having a fluid tight construction and a plurality of internal compartments for receiving or holding diving personnel at the working depth pressure of said first named diving vessel, said second vessel having an access port means through one of its vertical walls for transfer of personnel to and from the interior of the second vessel when said second vessel is coupled to the access port means of said diving vessel, each of the access port means of each vessel having door means for sealing said vessels from external environments when the access ports are not being used for transferring personnel, and
a guiding and aligning means combined with said two vessels for aligning said diving vessel with the pressure vessel for a coupling relationship, said guiding and aligning means including a guideway attached to said pressure vessel and extending outwardly therefrom at an end of said pressure vessel which includes the access port means of the pressure vessel, and
a support means carried within said guideway and movable toward and away from said pressure vessel for supporting said diving vessel and for moving the same toward and away from said pressure vessel, said support means comprising a substantially flat plate which is mounted in said guideway in a horizontal plane and which includes upwardly projecting members for receiving said diving vessel and for positioning the same as it is being lowered by hoisting apparatus onto said flat plate.

10. A method of transferring diving personnel to and from an underwater working depth level while under pressure, said method utilizing a system which includes (a) a diving bell vessel having a horizontally disposed passageway through a side wall which can be sealed, together with a vertically disposed passageway through a bottom of the diving bell vessel and which also can be sealed, and (b) an above-deck pressure vessel having a horizontally disposed passageway through a side wall which can be sealed and which can be coupled in sealed relationship to the side wall passageway of the diving bell vessel, said method comprising the steps of:
coupling said horizontally disposed passageway of said diving bell vessel to said horizontally disposed passageway of said above-deck pressure vessel by aligning and sealing the said passageways for forming a continuous horizontal passageway between the two vessels for transferring divers under pressure into or out of said diving bell vessel while protecting the divers from a decompression which would be harmful,
transferring one or more divers into said diving bell vessel through said horizontally diposed fluid-tight passageway formed between the two vessels and which is opened after the vessels are coupled together, said transferring step taking place at a level which is above a floor level of said diving bell vessel, and maintaining the diving bell vessel and passageway sealed from the atmosphere while a transfer is being made, said diving bell vessel and said above-deck pressure vessel being at the approximate pressure of the underwater work level,
sealing said diving bell vessel from the above-deck pressure vessel so that the vessels may be uncoupled and so that there will be no substantial loss of pressure within said diving bell vessel, uncoupling said diving bell vessel from said above-deck pressure vessel, lowering the diving bell vessel to an underwater working level, opening a bottom hatch in the vertically disposed passageway of the diving bell vessel from within the diving bell vessel for permitting a movement of the divers into and out of an underwater environment, and maintaining the gas pressure within said diving bell vessel at the approximate pressure of the underwater work level so that the diving bell vessel is maintained in a substantially dry condition while the bottom hatch is open and while the diving bell vessel is being used as an underwater work station, sealing said bottom hatch of the diving bell vessel, and maintaining the pressure within said diving bell vessel at the approximate underwater work level pressure when said diving bell vessel is lifted to the surface upon completion of an underwater operation so that divers within the diving bell vessel are not harmed by any unsafe decompression while being lifted to the surface, recoupling said diving bell vessel in a sealed relationship to the above-deck pressure vessel by aligning and sealing said horizontally disposed passageways in the side wall portions of the two vessels, whereby compressed divers may be transferred into and out of said diving bell vessel through the horizontally disposed passageway which is located above a floor level of the diving bell vessel, and if a diver is in a stricken condition within the diving bell vessel he may be treated or removed safely without opening the bottom hatch of the diving bell vessel and without reducing the pressure within said diving bell vessel to a harmful level, and maintaining an essentially upright orientation of said diving bell vessel for all operations of the diving bell vessel in transferring divers, in lowering and raising divers, and in using the diving bell vessel as an underwater work station.

11. A method of transferring diving personnel to and from an underwater working depth level while under pressure, comprising the steps of:

sealing one or more divers into a diving bell vessel and raising the gas pressure within said diving bell vessel to the approximate pressure of the underwater working level pressure at which the divers will be operating, lowering the diving bell vessel to an underwater working level, opening a bottom hatch in the diving bell vessel from within the diving bell vessel for permitting a movement of the divers into and out of an underwater environment, and maintaining the gas pressure within said diving bell vessel at the approximate pressure of the underwater work level so that the diving bell vessel is maintained in a substantially dry condition while the bottom hatch is open, and while the diving bell vessel is being used as an underwater work station, sealing said bottom hatch of the diving bell vessel, and maintaining the pressure within said diving bell vessel at the approximate underwater work level pressure when said diving bell vessel is lifted to the surface upon completion of an underwater operation so that divers within the diving bell vessel are not harmed by any unsafe decompression while being lifted to the surface, coupling said diving bell vessel to an above-deck pressure vessel which has an internal gas pressure approximately equal to the internal pressure of the diving bell vessel, said diving bell vessel and said above-deck pressure vessel each having a horizontally disposed passageway through a side wall portion thereof, said coupling step being accomplished by aligning and sealing the horizontally disposed passageways through the side wall portions of the two vessels, opening said horizontally disposed passageways between the coupled and sealed vessels and transferring divers out of the diving bell vessel, said transferring step taking place at a level which is above a floor level of said diving bell vessel and through said aligned horizontally disposed passageways, whereby compressed divers may be transferred into and out of the diving bell vessel, and if a diver is in a stricken condition within the diving bell vessel he may be treated or removed safely without opening the bottom hatch of the diving bell vessel and without reducing the pressure within said diving bell vessel to a harmful level, and maintaining an essentially upright orientation of said diving bell vessel for all operations of the diving bell vessel in transferring divers, in lowering and raising divers, and in using the diving bell vessel as an underwater work station.

References Cited

UNITED STATES PATENTS

| | | | |
|---|---|---|---|
| 962,019 | 6/1910 | Flood et al. | 61—69.1 |
| 1,008,301 | 11/1911 | Baker | 61—69.1 |
| 2,335,450 | 11/1943 | Sandberg | 61—83 |
| 2,433,189 | 12/1947 | Amato | 114—16.7 |
| 2,589,146 | 3/1952 | Samuelson | 61—46.5 |

FOREIGN PATENTS

| | | |
|---|---|---|
| 294,749 | 8/1928 | Great Britain. |
| 373,045 | 5/1932 | Great Britain. |

EARL J. WITMER, *Primary Examiner.*